US011729133B2

(12) United States Patent
Cheng et al.

(10) Patent No.: US 11,729,133 B2
(45) Date of Patent: Aug. 15, 2023

(54) SOFTWARE DEFINED NETWORK PUBLISH-SUBSCRIBE SYSTEM AND METHOD

(71) Applicant: Beijing University of Posts and Telecommunications, Beijing (CN)

(72) Inventors: Bo Cheng, Beijing (CN); Yang Zhang, Beijing (CN); Shuai Zhao, Beijing (CN); Yingying Zhang, Beijing (CN); Junliang Chen, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/966,759

(22) Filed: Oct. 14, 2022

(65) Prior Publication Data

US 2023/0038425 A1 Feb. 9, 2023

Related U.S. Application Data

(63) Continuation of application No. PCT/CN2020/114952, filed on Sep. 14, 2020.

(30) Foreign Application Priority Data

Apr. 20, 2020 (CN) .......................... 202010314160.9

(51) Int. Cl.
*H04L 51/58* (2022.01)
*H04L 67/568* (2022.01)

(52) U.S. Cl.
CPC ............ *H04L 51/58* (2022.05); *H04L 67/568* (2022.05)

(58) Field of Classification Search
CPC ...... H04L 51/00–51/58; H04L 67/00–67/5682
See application file for complete search history.

(56) References Cited

U.S. PATENT DOCUMENTS

2006/0159096 A1* 7/2006 Gershinsky ......... H04L 12/1859
370/473
2015/0006555 A1* 1/2015 Fang .................... H04L 51/214
707/755

(Continued)

FOREIGN PATENT DOCUMENTS

| CN | 105915419 A | 8/2016 |
| CN | 107888499 A | 4/2018 |
| GN | 104079614 A | 10/2014 |

OTHER PUBLICATIONS

Akram Hakiri et al., "Publish/subscribe-enabled software defined networking for efficient and scalable IoT communications", IEEE Communications Magazine, pp. 1-8 (Year: 2015).*

(Continued)

*Primary Examiner* — Clayton R Williams
(74) *Attorney, Agent, or Firm* — Nitin Kaushik

(57) ABSTRACT

Embodiments of the present disclosure provide a software defined network publish-subscribe system and method. The software defined network publish-subscribe system comprises a controller, an administrator controller, a sequencing subsystem and a message multi-backup cache subsystem. The controller is configured to process publish-subscribe transactions in clusters, and comprises sequencing nodes used for generating ordered serial numbers for messages and cache nodes for caching the messages. The administrator controller is configured to simultaneously perform functions of the controller and manage software-defined network. The sequencing subsystem is configured to realize the cooperative sequencing between the administrator controller and the sequencing nodes. The message multi-backup cache subsystem is configured to realize the consistency of the messages through the administrator controller and the cache nodes. Through the interaction of various modules, the consensus of various subscribers on the messages and the message (Continued)

serial numbers is realized on the software defined network publish-subscribe system.

6 Claims, 7 Drawing Sheets

(56) References Cited

U.S. PATENT DOCUMENTS

| | | | |
|---|---|---|---|
| 2015/0172383 A1 | 6/2015 | Decusatis et al. | |
| 2018/0213018 A1* | 7/2018 | Madani | H04L 67/561 |
| 2018/0302343 A1* | 10/2018 | Lokman | H04L 41/122 |
| 2019/0147093 A1* | 5/2019 | Ikkaku | H04L 69/28 |
| | | | 707/737 |
| 2019/0208032 A1* | 7/2019 | Sivasubramanian | |
| | | | H04L 1/1614 |

OTHER PUBLICATIONS

Title of the Item: China Master's Theses Full-text Database Publication Date: Aug. 15, 2019 Name of the Author: Guanqun Zhang Article Title: Research and Design of Multimedia Transmission Over Pub/Sub System in SDN Networks.

* cited by examiner

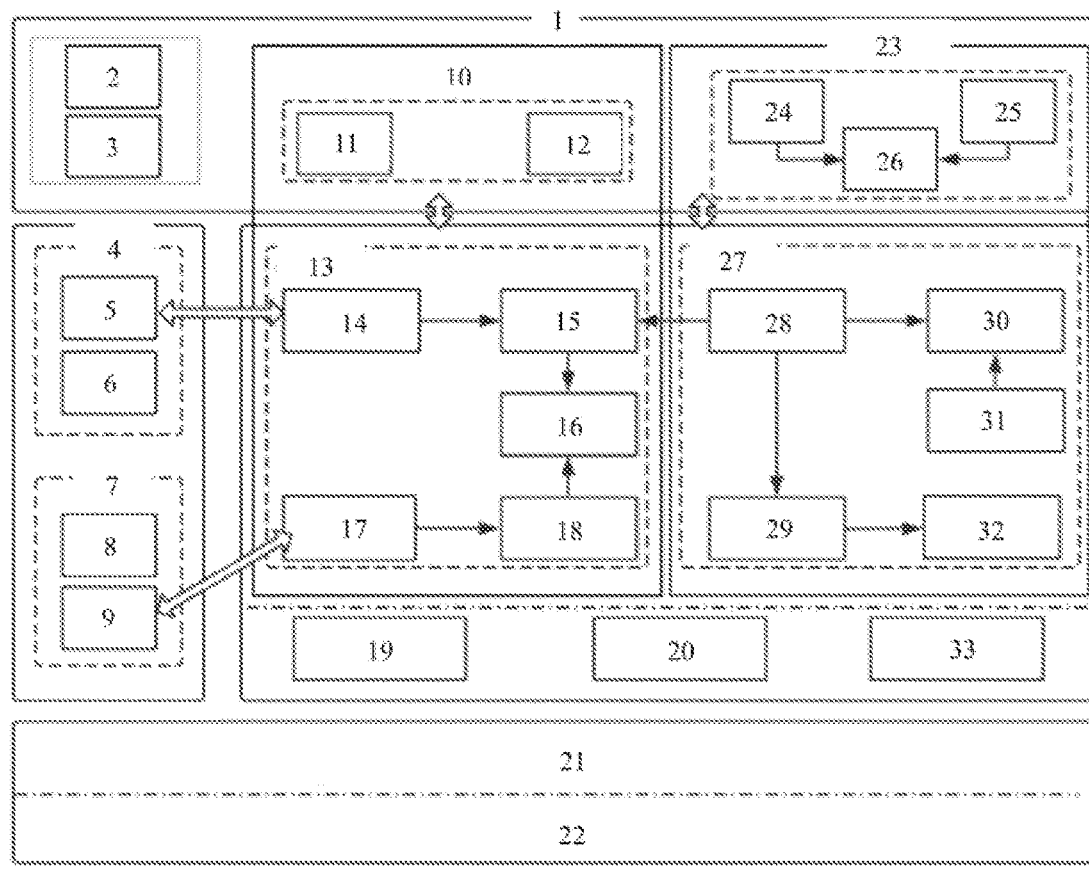

1: Administrator    2: System management and control platform management
3: Function servitization    4: Publisher    5: Reliable message access
6: Access cache node selection    7: Subscriber
8: Missing message serial number application    9: Missing message request
10: Message multi-copy cache module based on a message forwarding path
11: Saving node selection    12: Cache metadata protection
13: Saving nodes    14: Reliable monitoring of edge nodes
15: lowest-cost multi-point cache mechanism
16: Multi-point backup consistency guarantee
17: Message missing request processing    18: Quick search of cache data
19: Topology management oriented to sequencing optimization
20: Routing management oriented to message cache optimization
21: Cluster controller: topology pipeline, publish-subscribe management, routing management and flow table management.    22: SDN switch
23: Distributed sequencing module    24: Sequencing node selection
25: Token management serial number synchronization
26: Crash managment of sequencing nodes    27: Sequencing node
28: Cooperative sequencing    29: Crash Management based on moderator tokens
30: Sequencing algorithm based on message arrival sequence
31: Missing serial number request processing    32: Administrator recomputation
33: Flow table generation management based on bypass cache

FIG. 1

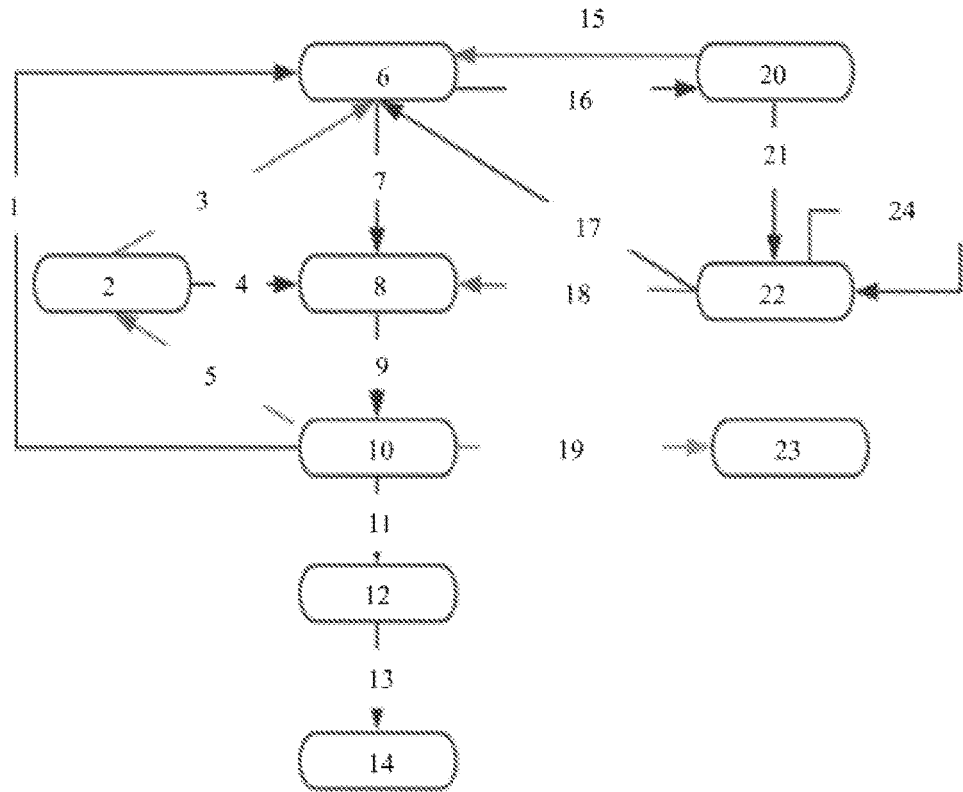

1: Receive: Notice of election of other nodes    2: Waiting
3: Receive: other nodes have been elected    4: Overtime
5: Receive: less than half of the votes    6: Normal operation
7: No message received overtime    8: Preparing for elections
9: Send: voting request    10: Candidate
11: Receive: exceed half of the votes    12: Administrator preparation
13: Send: notice of election ; Receive: synchronization of serial numbers
14: Administrator startup    15: A node that initiates the application has been invalid; Send:   node has been invalid
16: Receive: voting request    17: Receive: a node has already been selected
18: No message received overtime    19: Receive: node has been invalid
20: Preparing to vote    22: Voted    23:   End
21: A node that initiates the application is a valid node; Send: voting
24: Vote requests from other nodes are received and will not be processed.

FIG. 4

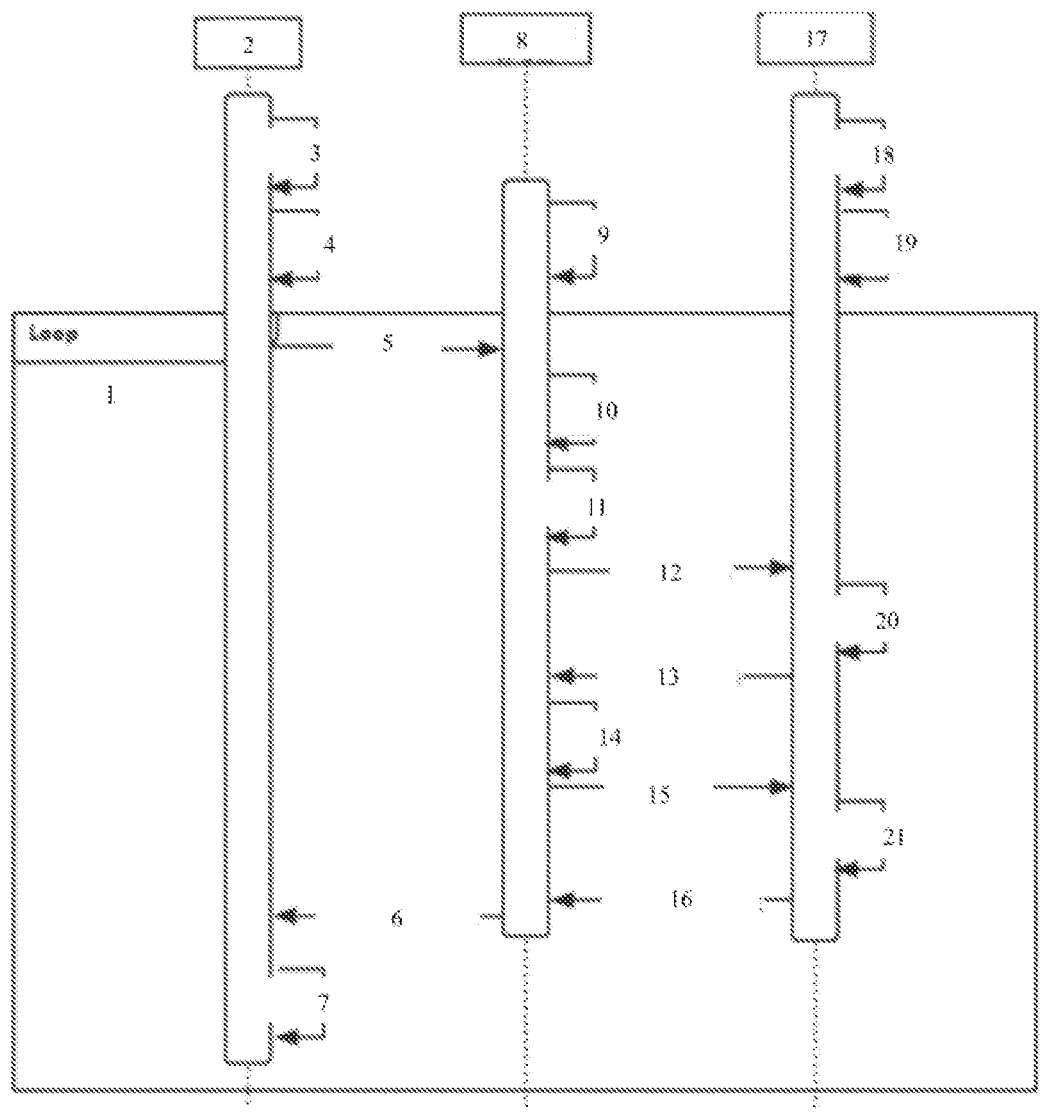

1. synchronizing cycle
2: Temporary cache node
3: Bypass monitoring subject
4: Storing messages in a memory
5: Messages m-n
6: Synchronous completion of messages m-n
7: Deleting messages m-n
8: Network edge cache nodes
9: Serial number monitoring
10: Matching serial numbers with messages
11: Persistently storing messages
12: Messages serial numbers m-n
13: Missing message serial numbers
14: Obtaining messages
15: Missing messages
16: Synchronous completion of messages m-n
17: Backup nodes
18: Bypass monitoring subject
19: Storing messages in a memory
20: Calculating missing message serial numbers
21: Persistently storing messages

FIG. 6

SOFTWARE DEFINED NETWORK PUBLISH-SUBSCRIBE SYSTEM AND METHOD

CROSS-REFERENCE TO RELATED APPLICATIONS

The application claims priority to Chinese patent application No. 202010314160.9, filed on Apr. 20, 2020, the entire contents of which are incorporated herein by reference.

TECHNICAL FIELD

The present disclosure relates to the field of message communication, and in particular to a software defined network publish-subscribe system and method.

BACKGROUND

A Software Defined Network (SDN) is a new network innovation architecture proposed by Stanford University in the United States, and it is a way to realize network virtualization. In the software architecture, publish-subscribe is a message paradigm in which senders (called publishers) of messages do not send the messages directly to specific recipients (called subscribers). Instead, published messages are divided into different categories without knowing which subscribers (if any) may exist.

The software defined network publish-subscribe system combines the characteristics of a publish-subscribe system and SDN network. With the help of SDN network's characteristics of control and forwarding separation, centralized control and programmability, the software defined network publish-subscribe system solves the problems of real-time performance and security in traditional network. At the same time, combined with the characteristics of the publish-subscribe system, the software defined network publish-subscribe system decouples the two sides of message communication, the specific message forwarding and routing calculation functions are provided by the system, and finally, a stable and efficient message middleware network is constructed. At the same time, it is also a decentralized message communication network with fast transmission.

However, with the growing scale of the software defined network publish-subscribe system and the increasing number of messages, the system needs to realize the consensus of messages and message serial numbers. Message consensus mainly means that if a message is passed to a subscriber, all subscribers who subscribe to the message can receive the message; and the consensus of message serial numbers refers to the global ordering of the messages in the system. The software defined network publish-subscribe system is a distributed decentralized system, so the current distributed consensus mechanism cannot be directly applied to the system.

SUMMARY

The embodiment of the present disclosure provides a software defined network publish-subscribe system. Through the interaction of various modules, the consensus of various subscribers on messages and message serial numbers is realized on the software defined network publish-subscribe system.

In first aspect, the embodiment of the present disclosure provides a software defined network publish-subscribe system, which comprises:

a controller, an administrator controller, a sequencing subsystem and a message multi-backup cache subsystem.

The controller is configured to process publish-subscribe transactions in clusters, and comprises sequencing nodes used for generating ordered serial numbers for messages and cache nodes for caching the messages;

the administrator controller is configured to simultaneously perform functions of the controller and manage software-defined network;

the sequencing subsystem is configured to realize the cooperative sequencing between the administrator controller and the sequencing nodes; and the message multi-backup cache subsystem is configured to realize the consistency of the messages through the administrator controller and the cache nodes.

Optionally, the sequencing subsystem is configured to:

drive the sequencing nodes in the controller to sequence the messages according to administrator tokens, and sequence the messages in batches in a distributed sequencing mode when the sequencing nodes are multi-sequencing nodes; and the sequencing nodes issue the serial numbers in a secondary broadcast mode.

Optionally, the sequencing subsystem specifically comprises:

a sequencing node selection module configured to realize the selection of the sequencing nodes through the administrator controller;

a sequencing node crash management module configured to realize the crash management of the sequencing nodes through the administrator controller;

an administrator controller crash management module configured to realize the crash management of the administrator controller through the sequencing nodes; or an administrator controller reselection module configured to realize the reselection of the administrator controller through the sequencing nodes.

Optionally, the sequencing node selection module is further configured to:

define one sequencing node for each subject tree by taking the subject tree as a unit; and monitor the messages according to the sequencing nodes when the publishing nodes publish the messages.

The sequencing node crash management module is further configured to: select the sequencing nodes through a sequencing node selection algorithm according to the topology situation of each cluster in the network and the publishing situation of each cluster node, and send the selected sequencing nodes to the administrator controller through broadcasting;

wherein the administrator controller determines whether the sequencing nodes crash or not according to the received replies from the sequencing nodes.

Optionally, the administrator controller crash management module is further configured to:

start a sequencing thread, and send a successful starting message to the administrator controller, and determine whether the administrator controller crashes or not according to the received reply from the administrator controller.

The administrator controller reselection module is further configured to:

send a voting application to other sequencing nodes except the present sequencing node, and vote for the present sequencing node; and select a new administrator controller according to the received messages sent by other sequencing nodes.

Optionally, the message multi-backup cache subsystem specifically comprises:

a cache node selection module configured to select the cache nodes comprising temporary cache nodes, network edge cache nodes and backup cache nodes;

a message cache management module configured to realize the persistent storage of the messages, and adopt a double-layer index mode to realize the quick search of the messages; and a node-to-node message synchronization module configured to synchronize the messages among the temporary cache nodes, the network edge cache nodes and the backup cache nodes.

Preferably, the cache node selection module is further configured to:

define publishing nodes of the messages as the temporary cache nodes;

divide publishing clusters into no less than one publishing group according to the publish-subscribe situation and physical connection situation of the system, and select one central publishing cluster in each publishing group as the network edge cache node; and select no less than one cluster node on a message forwarding path of the publishing group as a backup cache node of the network edge cache node.

Optionally, the node-to-node message synchronization module is further configured to:

regularly send the messages in batches to the network edge cache nodes through the temporary cache nodes;

match the ID numbers of the messages with the serial numbers through the network edge cache nodes, cache the messages in files according to the serial number sequence after successful matching, and send a paired ID number and serial number list to the backup cache nodes;

calculate current missing messages through the backup cache nodes, and return the serial numbers of the missing messages thereof to the network edge cache nodes; and synchronize the missing messages of the backup cache nodes to the backup cache nodes through the network edge cache nodes.

In second aspect, the embodiment of the present disclosure provides a software defined network publish-subscribe method, which comprises the following steps:

sending the administrator tokens to the sequencing nodes;

sequencing the messages by the sequencing nodes, and sequencing the messages in batches in a distributed sequencing mode when the sequencing nodes are multi-sequencing nodes;

selecting the sequencing nodes according to the topology situation of each cluster in the network and the publishing situation of each cluster node, and sending the selected sequencing nodes through broadcasting;

determining whether the sequencing nodes crash or not according to the received replies from the sequencing nodes; and/or sending a message of success in starting the thread, and determining whether the administrator controller crashes or not according to the received feedback information.

Optionally, the method further comprises:

defining the publishing nodes of the messages as the temporary cache nodes, selecting the central publishing clusters as the network edge cache nodes from the publishing groups, and selecting the cluster nodes on message forwarding paths of the publishing groups as the backup cache nodes of the network edge cache nodes;

persistently storing the messages through the network edge cache nodes;

regularly sending the messages in batches to the network edge cache nodes through the temporary cache nodes; matching the ID numbers of the messages with the serial numbers through the network edge cache nodes, and caching the messages in the files according to the serial number sequence; and calculating the current missing messages through the backup cache nodes, and synchronizing the missing messages of the backup cache nodes to the backup cache nodes through the network edge cache nodes.

The software defined network publish-subscribe system provided by the embodiment of the present disclosure comprises a controller, an administrator controller, a sequencing subsystem and a message multi-backup cache subsystem. The sequencing nodes in the controller are driven by administrator tokens to sequence the messages, and determined serial numbers are issued in a secondary broadcast mode. The synchronization of network edge cache nodes and backup nodes thereof is also realized through the message multi-backup cache subsystem.

BRIEF DESCRIPTION OF DRAWINGS

In order to describe the technical solutions in the embodiments of the present disclosure or the prior art more clearly, the drawings required to be used in the description of the embodiments or the prior art will be briefly introduced below. It is apparent that the drawings described below are only some embodiments of the present disclosure. Those of ordinary skill in the art may further obtain other drawings according to these drawings without creative work.

FIG. 1 is an architectural diagram of a software defined network publish-subscribe system according to the present disclosure.

FIG. 4 is a state diagram of administrator reselection according to an embodiment of the present disclosure.

FIG. 6 is a sequence diagram of message backup synchronization according to an embodiment of the present disclosure.

DETAILED DESCRIPTION OF THE EMBODIMENTS

Figure 2:
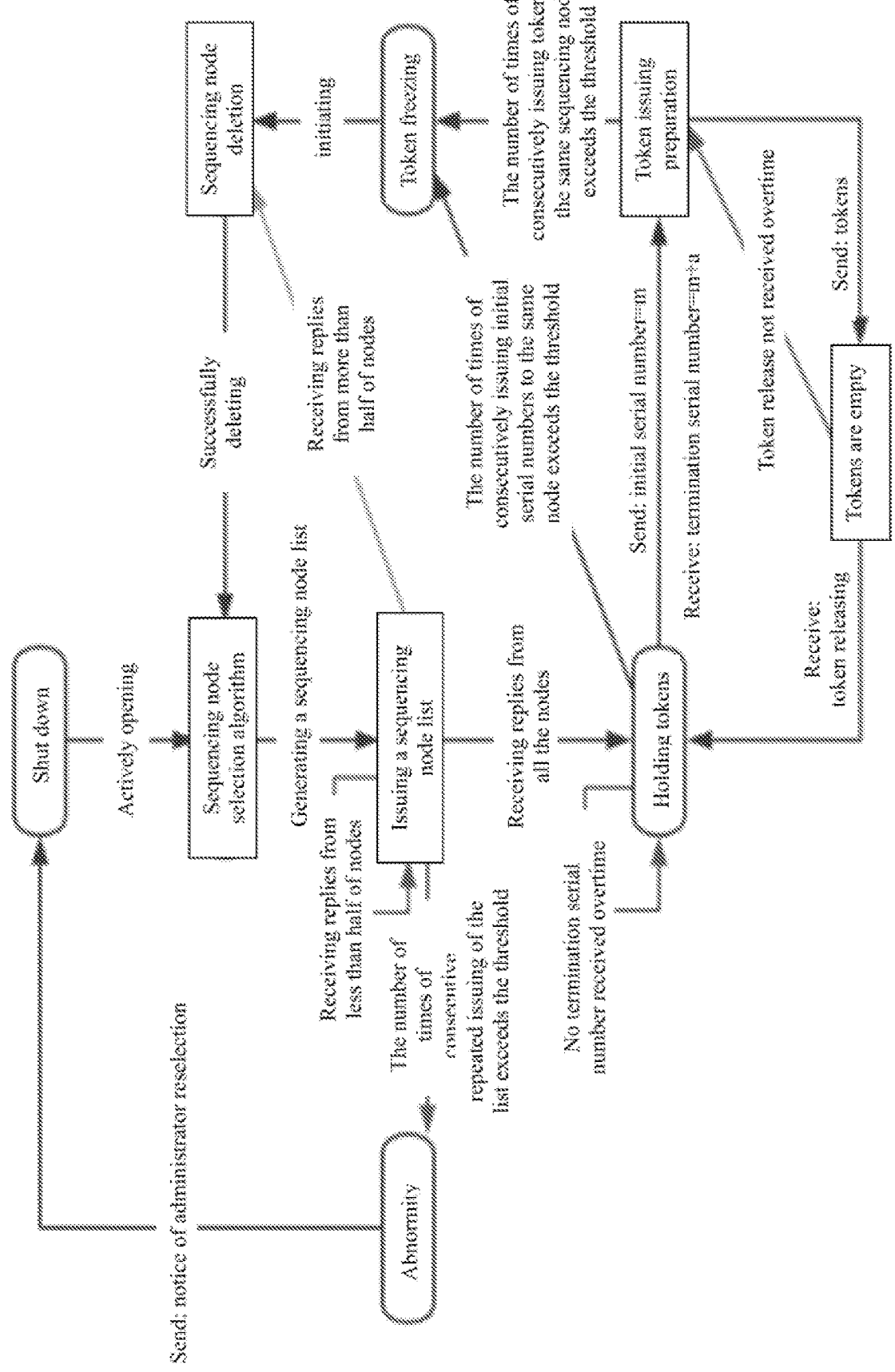
FIG. 2 is a state diagram of sequencing node crash management according to an embodiment of the present disclosure.

In order to make objects, technical solutions and advantages of embodiments of the present disclosure clearer, the technical solutions in the embodiments of the present disclosure are clearly and completely described below in conjunction with the accompanying drawings in the embodiments of the present disclosure, and it is apparent that the described embodiments are parts of embodiments rather than all embodiments of the present disclosure. All other embodiments obtained by a person of ordinary skill in the art based on the embodiments of the present disclosure without creative efforts shall fall within the protection scope of the present disclosure.

As shown in FIG. 1, the embodiment of the present disclosure provides a software defined network publish-subscribe system, which comprises:

a controller, an administrator controller, a sequencing subsystem and a message multi-backup cache subsystem.

The controller is configured to process publish-subscribe transactions in clusters, and comprises sequencing nodes used for generating ordered serial numbers for messages and cache nodes for caching the messages;

the administrator controller is configured to simultaneously perform functions of the controller and manage software-defined network;

the sequencing subsystem is configured to realize the cooperative sequencing between the administrator controller and the sequencing nodes; and the message multi-backup cache subsystem is configured to realize the consistency of the messages through the administrator controller and the cache nodes.

Specifically, the software defined network publish-subscribe system provided by the embodiment of the present disclosure further comprises publishing nodes, which are used for providing interfaces for publishing messages to users, receiving the messages published by the users, generating a unique ID serial number for each message, and finally encapsulating the message with the unique ID for forwarding. The publish-subscribe system further comprises subscribing nodes, which are used for providing subscribing interfaces to the users, are responsible for corresponding the messages to the serial numbers, and make query requests when the messages or the message serial numbers are confirmed. The publish-subscribe system further comprises a switch, which is mainly responsible for forwarding the messages according to forwarding rules issued by the controller.

Wherein the controller is mainly configured to process the publish-subscribe transactions in the clusters, meanwhile has the functions of topology management, routing management and flow table management for physical environment processing, and is one of the core components of SDN. In addition, the concepts of the sequencing nodes and the cache nodes are also defined on the controller. The sequencing nodes are responsible for generating the ordered serial numbers for the messages, and the cache nodes realize the caching of the messages. Wherein the administrator controller is a special kind of controller, and has the functions of the controller and the function of managing the whole network.

The sequencing subsystem is mainly configured to realize cooperative sequencing between the administrator controller and the sequencing nodes. In addition, the administrator controller is also responsible for the selection and crash management of the sequencing nodes, and the sequencing nodes are responsible for the crash management of an administrator and the reselection of the administrator after the administrator crashes.

The message multi-backup cache subsystem is configured to select the cache nodes, manage message caching and synchronize messages between nodes. Wherein the administrator controller is responsible for selecting the cache nodes, the cache nodes in the controller are configured to manage the message caching, and the network edge cache nodes are configured to realize the consistency of the messages between the network edge cache nodes and the backup cache nodes.

As an embodiment of the present disclosure, the sequencing subsystem is mainly configured:

drive the sequencing nodes in the controller to sequence the messages according to administrator tokens, and sequence the messages in batches in a distributed sequencing mode when the sequencing nodes are multi-sequencing nodes; and the sequencing nodes issue the serial numbers in a secondary broadcast mode.

Specifically, the sequencing subsystem is configured to realize cooperative sequencing between the administrator controller and the sequencing nodes, wherein in the sequencing process, the administrator controller drives the sequencing nodes to perform sequencing through the tokens, the messages are sequenced in batches in a distributed sequencing mode when the sequencing nodes are multi-sequencing nodes, and after sequencing is completed, the sequencing nodes issue the serial numbers in a secondary broadcast mode.

As an embodiment of the present disclosure, the sequencing subsystem specifically comprises:

a sequencing node selection module configured to realize the selection of the sequencing nodes through the administrator controller;

a sequencing node crash management module configured to realize the crash management of the sequencing nodes through the administrator controller;

an administrator controller crash management module configured to realize the crash management of the administrator controller through the sequencing nodes; or an administrator controller reselection module configured to realize the reselection of the administrator controller through the sequencing nodes.

Specifically, the sequencing subsystem comprises the following modules: the sequencing node selection module, the sequencing node crash management module, the administrator controller crash management module, and the administrator controller reselection module. Various modules are respectively configured to realize the selection and crash management of the sequencing nodes, and the crash management and reselection of administrator controller through the cooperation of the administrator controller and the sequencing nodes.

As an embodiment of the present disclosure, the sequencing node selection module is further configured to define one sequencing node for each subject tree by taking the subject tree as a unit; and monitor the messages according to the sequencing nodes when the publishing nodes publish the messages.

The sequencing node crash management module is further configured to: select the sequencing nodes through a sequencing node selection algorithm according to the topology situation of each cluster in the network and the publishing situation of each cluster node, and send the selected sequencing nodes to the administrator controller through broadcasting, wherein the administrator controller determines whether the sequencing nodes crash or not according to the received replies from the sequencing nodes.

Specifically, the sequencing node selection module defines a sequencing node for each subject tree by taking the subject tree in the publish-subscribe system as a unit, and monitors the messages published by the publishing nodes through the sequencing node of each subject tree.

Further, as shown in FIG. 2, the specific functions of the sequencing node crash management module are as follows:

1. the administrator controller selects appropriate sequencing nodes through the sequencing node selection algorithm according to the topology situation of clusters in the network and the publishing situation of each cluster node, issues a selection result to each controller in the form of broadcast, and waits for the reply of successful creation of each sequencing node:

2. for the reply received by the administrator controller within the timeout period, there are the following four situations:

a) the administrator controller receives the reply of successful creation of all the sequencing nodes, determines at this time that the sequencing list is successfully issued, and all the sequencing nodes are successfully initialized, and at this time, goes to step 4;

b) the administrator controller receives replies from more than half of sequencing nodes, and determines at this time that sequencing nodes that do not reply may have problems, so deletes these sequencing nodes from the list, and step 1 is repeated:

c) the administrator controller receives the replies from less than half of the sequencing nodes, determines at this time that there may be problems in the issuing process of the administrator list, so reissues the sequencing node list and records the issuing number or times; and d) the number of times that the administrator controller continuously issues the list exceeds the threshold, and it is determined at this time that there is a problem with the administrator.

3. The administrator controller enters the token holding state and prepares to issue the token. The administrator controller sends the initial serial number of the token to the next sequencing node in a token ring and waits for the from the current sequencing node.

4. for the reply from the sequencing nodes within the timeout period, there are the following three situations:

a) the administrator controller receives the reply from the current sequencing node, which includes a termination serial number, and at this time, goes to step 5;

b) the administrator controller does not receive a reply, and the retransmission times do not exceed the retransmission threshold, so the administrator controller retransmits the initial serial number of the token to the sequencing node, and records the retransmission times; and c) the administrator controller does not receive a reply, the retransmission times exceed the retransmission threshold, it is determined at this time that the sequencing node crashes, the token is frozen, the sequencing node is deleted from the list, and step 1 is repeated.

5. The administrator controller enters the token issuing preparation state, and officially issues the token to the current node.

6. for the reply from the sequencing nodes within the timeout period, there are the following three situations:

a) the administrator controller receives the reply from the current sequencing node, the token is returned to the administrator controller at this time, and step 3 is repeated;

b) the administrator controller does not receive a reply, and the retransmission times do not exceed the retransmission threshold, so the administrator controller retransmits the token to the sequencing node, and records the retransmission times; and c) the administrator controller does not receive a reply, the retransmission times exceed the retransmission threshold, it is determined that the sequencing node crashes at this time, the token is frozen, the sequencing node is deleted from the list, and step 1 is repeated.

As an embodiment of the present disclosure, the administrator controller crash management module is further configured to:

start a sequencing thread, and send a successful starting message to the administrator controller, and determine whether the administrator controller crashes or not according to the received reply from the administrator controller.

The administrator controller reselection module is further configured to:

send a voting application to other sequencing nodes except the present sequencing node, and vote for the present sequencing node; and select a new administrator controller according to the received messages sent by other sequencing nodes.

Figure 3:
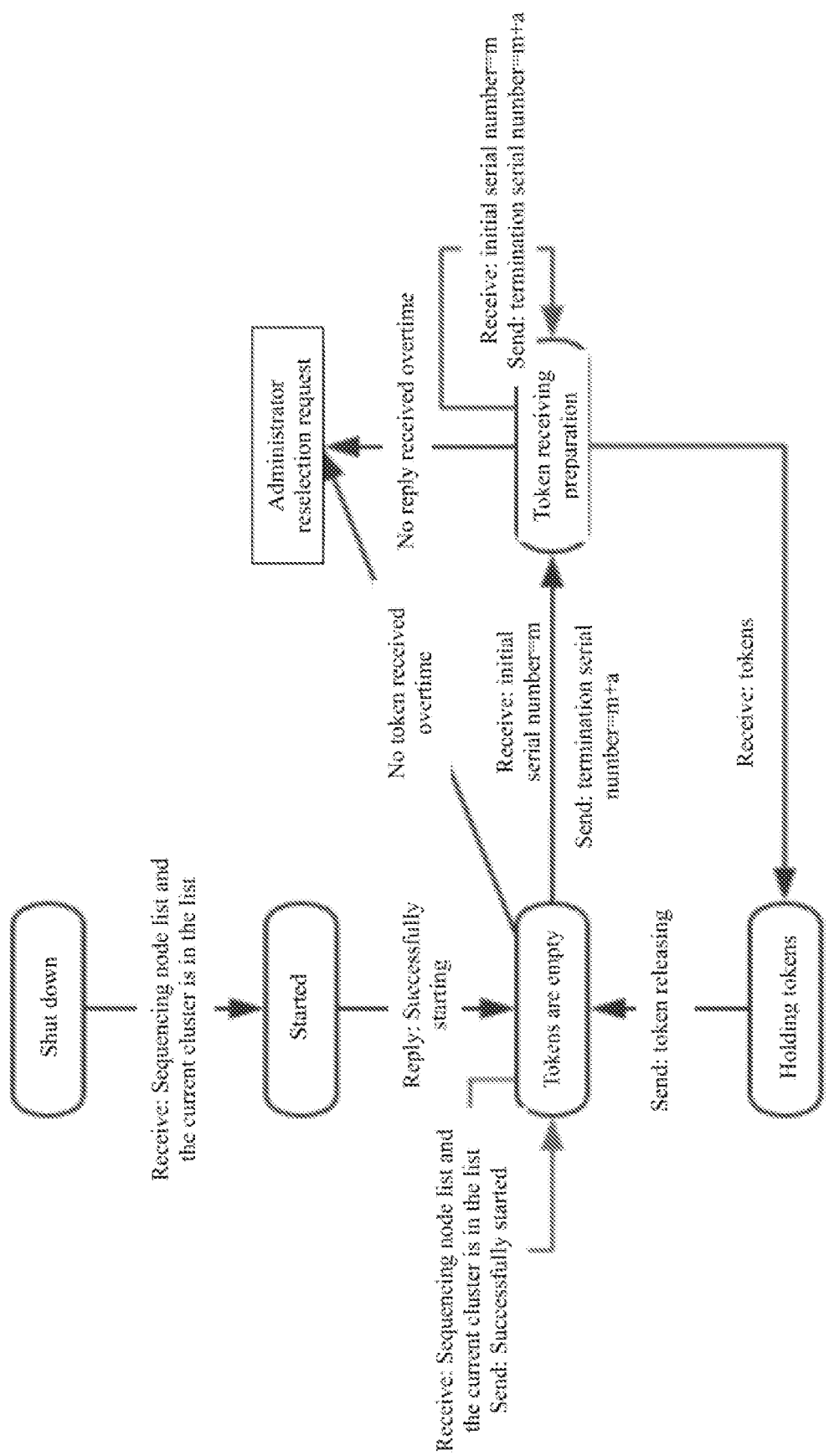
FIG. 3 is a state diagram of administrator crash management according to an embodiment of the present disclosure.

Specifically, as shown in FIG. 3, the specific functions of the administrator crash management module are as follows:

1. when the controller receives the sequencing node list from the administrator controller and the current cluster is in the list, it indicates that the current cluster has been selected as the sequencing node, and at this time, the sequencing node starts the sequencing thread and sends a successful startup message to the administrator controller;

2. the sequencing node enters the token waiting state, and for receiving a reply from the administrator controller with the timeout period, there are the following two main situations:

a) the sequencing node receives the initial serial number of the token sent by the administrator controller, and at this time, goes to step 3;

b) the sequencing node receives a cluster list message again, replies a message that the administrator controller has started, resets the timeout period, and returns to step 2;

c) the sequencing node does not receive any message, it is determined at this time that the administrator controller crashes, and the administrator controller reselection module is entered;

3. the sequencing node calculates the number of messages in the current message queue, obtains the termination serial number, and replies to the administrator controller;

4. at this time, the sequencing node enters the token receiving preparation state, and is ready to receive the token; and for receiving a reply from the administrator controller with the timeout period, there are the following two main situations:

a) the sequencing node receives a token message sent by the administrator controller, then enters the token holding state, starts to distribute serial numbers for messages in the message queue, broadcasts the serial numbers, sends a token release message, releases the token, and returns to step 2;

b) the sequencing node receives the initial serial number of the token again, replies to the termination serial number of the administrator controller, and resets the timeout period, and step 4 is repeated; and c) the sequencing node does not receive any message, it is determined at this time that the administrator controller crashes, and the administrator controller reselection module is entered.

Specifically, as shown in FIG. 4, the specific functions of the administrator reselection module are as follows:

1. The sequencing node fails to receive a message from the administrator controller after timeout, determines at this time that the administrator controller crashes and actively initiates the election. The sequencing note sends a voting application to other nodes, votes for yourself, and waits for the reply from other nodes.

2. According to the messages from other nodes, there may be the following four results:

a) if receiving more than half of the votes (including own vote), the current sequencing node will win the election and become the new administrator controller, and goes to step 3;

b) when the current sequencing node is told that other sequencing node has been elected, the current sequencing node switches to the normal operation state by itself;

c) if more than half of the votes are not received within the timeout period, enter the waiting state, and after the waiting time, enter step 1 again; and d) receiving a message that the current sequencing node has been deleted, indicating that the node is unavailable, and the sequencing node actively shuts down the service.

3. After the current sequencing node wins the election, the current sequencing node becomes the new administrator controller, will immediately send messages to all nodes to prevent the rest nodes from triggering a new election, sends a serial number synchronization request to the nodes and synchronizes the current serial numbers.

As an embodiment of the present disclosure, the message multi-backup cache subsystem specifically comprises:

a cache node selection module configured to select the cache nodes comprising temporary cache nodes, network edge cache nodes and backup cache nodes;

a message cache management module configured to realize the persistent storage of the messages, and adopt a double-layer index mode to realize the quick search of the messages; and a node-to-node message synchronization module configured to synchronize the messages among the temporary cache nodes, the network edge cache nodes and the backup cache nodes.

Specifically, the message multi-backup cache subsystem comprises the cache node selection module, the message cache management module and the node-to-node message synchronization module. The function of the message multi-backup cache submodule is completed by the administrator controller and the cache nodes, wherein the administrator controller is responsible for the selection of the cache nodes, and the cache nodes are responsible for realizing the lowest-cost multi-point cache mechanism, the quick search of the messages and the consistency of multi-point backup.

As an embodiment of the present disclosure, the cache node selection module is further configured to define publishing nodes of the messages as the temporary cache nodes;

divide publishing clusters into no less than one publishing group according to the publish-subscribe situation and physical connection situation of the system, and select one central publishing cluster in each publishing group as the network edge cache node;

select no less than one cluster node on a message forwarding path of the publishing group as a backup cache node of the network edge cache node;

Specifically, the cache node selection module is configured to define and select each cache node in the system, so that the backup of the messages can be carried out smoothly. The functions of the cache node selection module include: defining the publishing nodes of the messages as the temporary cache nodes, dividing publishing clusters into no less than one publishing group according to the publish-subscribe situation and physical connection situation of the system, and selecting one central publishing cluster in each publishing group as the network edge cache node; and selecting no less than one cluster node on the message forwarding path of the publishing group as the backup cache node of the network edge cache node. Election and definition of different cache nodes are prerequisites for realizing message synchronization between nodes.

As an embodiment of the present disclosure, the node-to-node message synchronization module is further configured to:

regularly send the messages in batches to the network edge cache nodes through the temporary cache nodes:

match the ID numbers of the messages with the serial numbers through the network edge cache nodes, cache the messages in files according to the serial number sequence after successful matching, and send a paired ID number and serial number list to the backup cache nodes;

calculate current missing messages through the backup cache nodes, and return the serial numbers of the missing messages thereof to the network edge cache nodes; and synchronize the missing messages of the backup cache nodes to the backup cache nodes through the network edge cache nodes.

Figure 5:
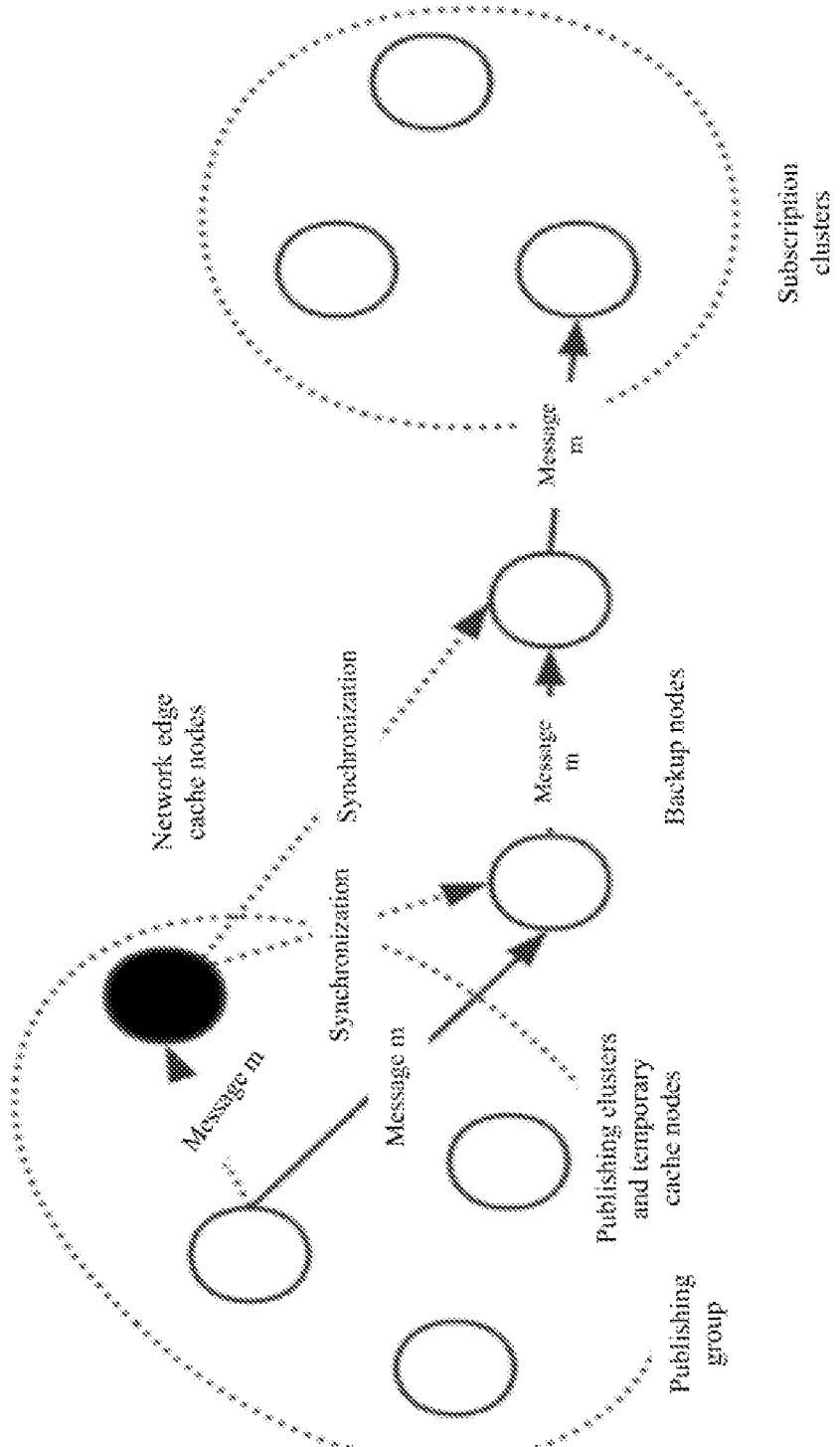
FIG. 5 is a relationship diagram of publishing groups, network edge cache nodes and backup cache nodes according to an embodiment of the present disclosure.

Specifically, as shown in FIG. 5, when the messages are published, the messages are sent to subscribers through the message forwarding paths, and each backup node obtains the message on the path in a bypass monitoring manner, and caches the message in a memory first. At the same time, the temporary cache nodes also obtain the topic messages in a bypass monitoring manner. Then, the temporary cache nodes regularly send the messages to the network edge cache nodes in batches through reliable connection with the network edge cache nodes. As the messages may be lost in network transmission, and the message forwarding path of the present system is a multi-source minimum disconnected subgraph, the backup cache node cannot be on the forwarding paths of all the publishing nodes, so all the messages published by the publishing clusters in the publishing groups cannot be received. The network edge cache nodes will synchronize the messages with the backup cache nodes regularly to ensure the consistency of multi-point caches.

In order to realize the synchronization of the messages between the nodes, as shown in FIG. 6, when the messages are published, both the temporary cache nodes and the backup cache nodes perform bypass monitoring on the messages and firstly store the message in the memory. Wherein the temporary cache nodes regularly send the messages in batches to the network edge cache nodes, and set the ID numbers of the messages at this time as m-n. Then, the network edge cache nodes match the ID numbers of the messages with the serial numbers, and if there is a message missing a serial number, a missing serial number request is made to the sequencing node. After all the messages are successfully matched, the messages are cached in the files according to the sequence of the serial numbers, and the paired ID number and serial number list is sent to the backup cache nodes after the messages are successfully saved. The backup cache nodes calculate the current missing messages and return the serial numbers of the missing messages. The network edge cache nodes synchronize the missing messages of the backup cache nodes to the backup cache nodes, and the backup cache nodes cache the received missing messages in the files and return messages of successful synchronization. At this time, the network edge cache nodes also return messages of successful synchronization to the temporary cache nodes, and the temporary cache nodes delete the messages in the memory. So far, the consistency synchronization of the messages m-n is completed.

Figure 7:
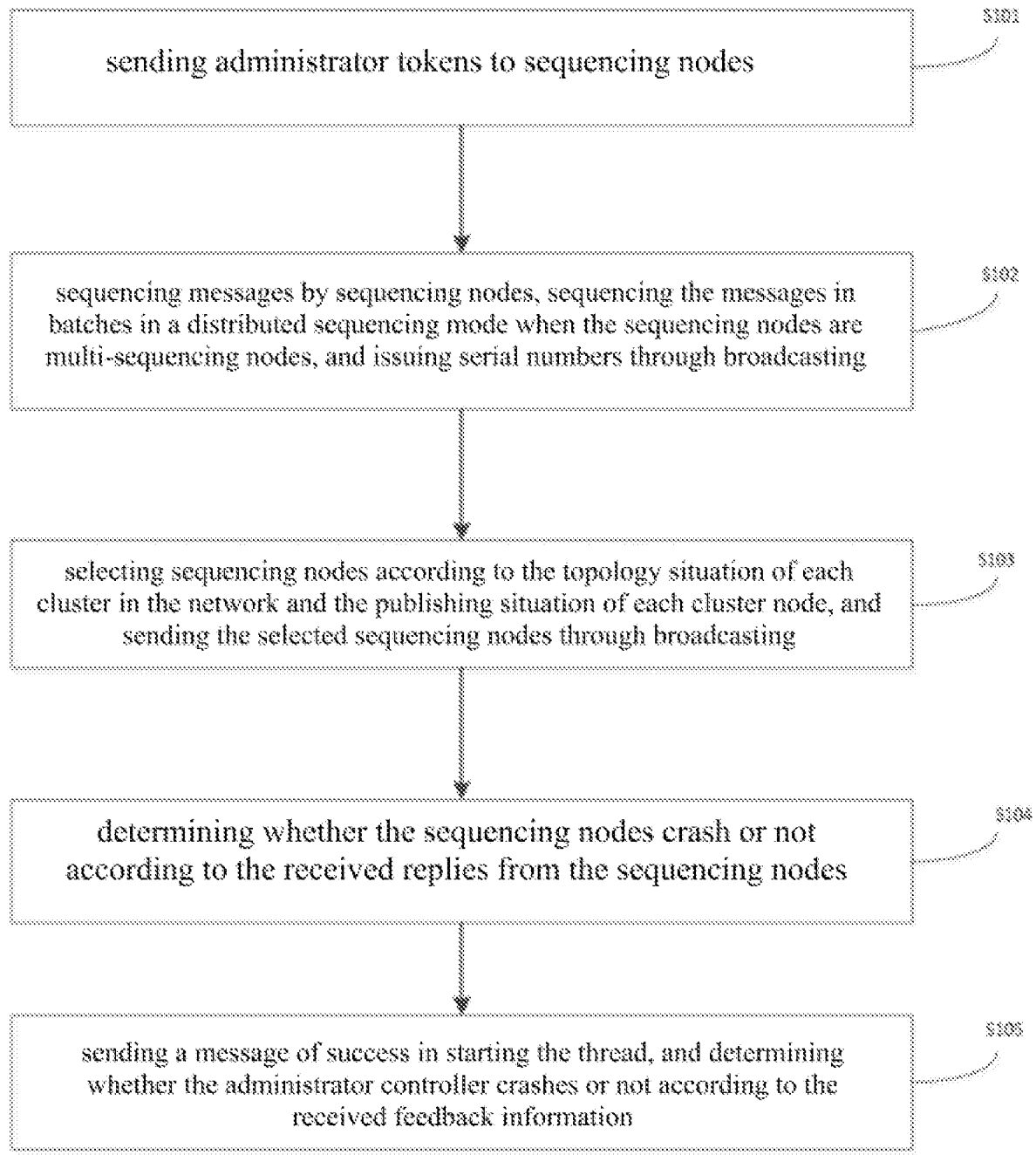
FIG. 7 is a flowchart of a software defined network publish-subscribe method provided by the embodiment of the present disclosure.

As shown in FIG. 7, the embodiment of the present disclosure further provides a software defined network publish-subscribe method based on the above software defined network publish-subscribe system, which comprises:

step 101. sending the administrator tokens to the sequencing nodes;

step 102. sequencing the messages by the sequencing nodes, and sequencing the messages in batches in a distributed sequencing mode when the sequencing nodes are multi-sequencing nodes;

step 103. selecting the sequencing nodes according to the topology situation of each cluster in the network and the publishing situation of each cluster node, and sending the selected sequencing nodes through broadcasting;

step 104. determining whether the sequencing nodes crash or not according to the received replies from the sequencing nodes; and/or step 105. sending a message of success in starting the thread, and determining whether the administrator controller crashes or not according to the received feedback information.

Specifically, the sequencing subsystem realizes the sequencing of the messages through the cooperation of the administrator controller and the sequencing nodes. The sequencing process comprises steps that: the administrator controller sends the administrator tokens to the sequencing nodes, the sequencing nodes sequence the messages after receiving the administrator tokens, the messages are sequenced in batches in a distributed sequencing mode when the sequencing nodes are multi-sequencing nodes, and after sequencing is completed, the sequencing nodes issue the serial numbers in a secondary broadcast mode.

Further, the functions of the sequencing subsystem also include the crash management of the sequencing nodes and the crash management of the administrator controller. Wherein the collapse management of the sequencing nodes comprises the steps that:

1. the administrator controller selects appropriate sequencing nodes through the sequencing node selection algorithm according to the topology situation of clusters in the network and the publishing situation of each cluster node, issues a selection result to each controller in the form of broadcast, and waits for the reply of successful creation of each sequencing node;

2. for the reply received by the administrator controller within the timeout period, there are the following four situations:

a) the administrator controller receives the reply of successful creation of all the sequencing nodes, determines at this time that the sequencing list is successfully issued and all the sequencing nodes are successfully initialized, and then goes to step 4;

b) the administrator controller receives replies from more than half of sequencing nodes, and determines that sequencing nodes that do not reply may have problems at this time, so deletes these sequencing nodes from the list, and step 1 is repeated;

c) the administrator controller receives the replies from less than half of the sequencing nodes, determines at this time that there may be problems in the issuing process of the administrator list, so reissues the sequencing node list and records the issuing times;

d) the number of times that the administrator controller continuously issues the list exceeds the threshold, and it is determined at this time that there is a problem with administrators.

3. The administrator controller enters the token holding state and prepares to issue the tokens. The administrator controller sends the initial serial number of the token to the next sequencing node in a token ring and waits for the reply from the current sequencing node.

4. for the reply from the sequencing nodes within the timeout period, there are the following three situations:

a) the administrator controller receives the reply from the current sequencing node, which includes a termination serial number, and then goes to step 5;

b) the administrator controller does not receive a reply, and the retransmission times do not exceed the retransmission threshold, so the administrator controller retransmits the initial serial number of the token to the sequencing node, and records the retransmission times; and c) the administrator controller does not receive a reply, the retransmission times exceed the retransmission threshold, it is determined at this time that the sequencing node crashes, the token is frozen, the sequencing node is deleted from the list, and step 1 is repeated.

5. The administrator controller enters the token issuing preparation state, and officially issues the token to the current node.

6. for the reply from the sequencing nodes within the timeout period, there are the following three situations:

a) the administrator controller receives the reply from the current sequencing node, the token is returned to the administrator controller at this moment, and step 3 is repeated;

b) the administrator controller does not receive a reply, and the retransmission times do not exceed the retransmission threshold, so the administrator controller retransmits the token to the sequencing node, and records the retransmission times; and c) the administrator controller does not receive a reply, the retransmission times exceed the retransmission threshold, it is determined that the sequencing node crashes at this time, the token is frozen, the sequencing node is deleted from the list, and step 1 is repeated.

The collapse management of the administrator controller specifically comprises the steps that:

1. When the controller receives the sequencing node list from the administrator controller and the current cluster is in the list, it indicates that the current cluster has been selected as the sequencing node, and at this moment, the sequencing node starts the sequencing thread and sends a successful startup message to the administrator controller.

2. The sequencing node enters the token waiting state; and for receiving a reply from the administrator controller within the timeout period, there are the following two situations:

a) the sequencing node receives the initial serial number of the token sent by the administrator controller, and at this time, goes to step 3;

b) the sequencing node receives a cluster list message again, replies a message that the administrator controller has started, resets the timeout period, and returns to step 2;

c) the sequencing node does not receive any message, it is determined at this time that the administrator controller crashes, and the administrator controller reselection module is entered.

3. The sequencing node calculates the number of messages in the current message queue, obtains the termination serial number, and replies to the administrator controller;

4. At this time, the sequencing node enters the token receiving preparation state, and is ready to receive the token; and for receiving a reply from the administrator controller with the timeout period, there are the following two main situations:

a) the sequencing node receives a token message sent by the administrator controller, then enters the token holding state, starts to distribute serial numbers for messages in the message queue, broadcasts the serial numbers, sends a token release message, releases the token, and returns to step 2:

b) the sequencing node receives a cluster list message again, replies to the termination serial number of the administrator controller, resets the timeout period, and repeated to step 4:

c) the sequencing node does not receive any message, it is determined at this time that the administrator controller crashes, and the administrator controller reselection module is entered.

As an embodiment of the present disclosure, the method further comprises:

defining the publishing nodes of the messages as the temporary cache nodes, selecting the central publishing clusters as the network edge cache nodes from the publishing groups, and selecting the cluster nodes on message forwarding paths of the publishing groups as the backup cache nodes of the network edge cache nodes;

persistently storing the messages through the network edge cache nodes;

regularly sending the messages in batches to the network edge cache nodes through the temporary cache nodes; matching the H) numbers of the messages with the serial numbers through the network edge cache nodes, and caching the messages in the files according to the serial number sequence; and calculating the current missing messages through the backup cache nodes, and synchronizing the missing messages of the backup cache nodes to the backup cache nodes through the network edge cache nodes.

Specifically, the function of the message multi-backup cache subsystem is completed by the administrator controller and the cache nodes, wherein the administrator controller is responsible for the selection of the cache nodes, the cache management of the messages and realization of message consistency.

Election and definition of different cache nodes are prerequisites for realizing the synchronization of the messages between nodes, wherein the selection of the cache nodes includes: defining the publishing nodes of the messages as the temporary cache nodes which are configured to regularly send the messages in batches to the network edge cache nodes; dividing the publishing clusters into no less than one publishing group according to the publish-subscribe situation and physical connection situation of the system, and selecting one central publishing cluster in each publishing group as the network edge cache node which is configured to receive the messages sent by the temporary cache nodes and match the ID numbers and serial numbers of the messages; and the network edge cache nodes are also responsible for the cache management of the messages, and realizes the quick search of the messages in a double-layer index mode. For the selection of the backup nodes, no less than one cluster node is selected on the message forwarding path of the publishing group as the backup cache node of the network edge cache node, and the backup cache node is used for backing up the message of the network edge cache node.

For the message synchronization between the network edge cache nodes and the backup cache nodes, when the messages are published, the message multi-backup cache subsystem performs bypass monitoring on the messages through the temporary cache nodes and the backup cache nodes, and stores the messages in the memory first. Wherein the temporary cache nodes regularly send the messages in batches to the network edge cache nodes, and set the ID numbers of the messages at this time as m-n. Then, the network edge cache nodes match the ID numbers of the messages with the serial numbers, and if there is a message missing a serial number, a missing serial number request is made to the sequencing node. After all the messages are successfully matched, the messages are cached in the files according to the sequence of the serial numbers, and the paired ID number and serial number list is sent to the backup cache nodes after the messages are successfully saved. The backup cache nodes calculate the current missing messages and return the serial numbers of the missing messages. The network edge cache nodes synchronize the missing messages of the backup cache nodes to the backup cache nodes, and the backup cache nodes cache the received missing messages in the files and return messages of successful synchronization. At this time, the network edge cache nodes also return messages of successful synchronization to the temporary cache nodes, the temporary cache nodes delete the messages in the memory, and thus, the message synchronization is completed.

The device embodiments described above are merely illustrative. The units described above as separated components may or may not be physically separated, and components shown as units may or may not be physical units, i.e., may be located at one place, or may be distributed across multiple network units. Some or all of the modules may be selected according to actual needs to achieve the purpose of the solution of the present embodiment. Those of ordinary skill in the art would understand and practice without involving any inventive effort.

Through the description of the above implementations, those skilled in the art can clearly understand that each embodiment may be implemented by means of software plus a necessary general hardware platform, of course, hardware can also be used. Based on such understanding, the essence of the above technical solution or parts making contributions to the prior art may be embodied in the form of a software product, and the computer software product may be stored in computer-readable storage media such as ROM RAM, magnetic disks, optical disks, etc., including instructions for enabling a computer device (which may be a personal computer, a server, or a network device, etc.) to perform the methods described in the various embodiments or some parts of the embodiment.

It should be illustrated finally that the above embodiments are only used for illustrating the technical solutions of the present disclosure, and are not intended to limit the present disclosure; although the present disclosure is illustrated in detail with reference to the foregoing embodiments, it should be understood by those skilled in the art that, modifications may still be made on the technical solutions written by the foregoing embodiments, or equivalent replacements are made on part of technical features; and these modifications or replacements do not make the essence of the corresponding technical solutions depart from the spirit and scope of the technical solution of the various embodiments of the present disclosure.

What is claimed is:

1. A software defined network publish-subscribe system, comprising:
    a processor;
    a controller, an administrator controller, a sequencing subsystem and a message multi-backup cache subsystem, wherein
    the controller is configured to process publish-subscribe transactions in clusters, and the controller comprises sequencing nodes used for generating ordered serial numbers for messages and cache nodes for caching the messages;

the administrator controller is configured to simultaneously perform functions of the controller and managing software-defined network;

the sequencing subsystem is configured to realize a cooperative sequencing between the administrator controller and the sequencing nodes;

the message multi-backup cache subsystem is configured to realize consistency of the messages through the administrator controller and the cache nodes;

wherein the message multi-backup cache subsystem comprises:

a cache node selection module configured to select the cache nodes comprising temporary cache nodes, network edge cache nodes and backup cache nodes;

a message cache management module configured to realize a persistent storage of the messages, and adopt a double-layer index mode to realize a search of the messages;

a node-to-node message synchronization module configured to synchronize the messages among the temporary cache nodes, the network edge cache nodes and the backup cache nodes;

the cache node selection module is further configured to:

define publishing nodes of the messages as the temporary cache nodes;

divide publishing clusters into no less than one publishing group according to a publish-subscribe situation and a physical connection situation of the system, and select one central publishing cluster in each publishing group as the network edge cache node;

select no less than one cluster node on a message forwarding path of each publishing group as a backup cache node of the network edge cache node;

the node-to-node message synchronization module is further configured to:

send the messages in batches to the network edge cache nodes through the temporary cache nodes;

match ID numbers of the messages with serial numbers through the network edge cache nodes, cache the messages in files according to a serial number sequence after successful matching, and send a paired ID number and a serial number list to the backup cache nodes;

calculate current missing messages through the backup cache nodes, and return the serial numbers of the missing messages thereof to the network edge cache nodes; and synchronize the missing messages of the backup cache nodes through the network edge cache nodes.

2. The system according to claim 1, wherein the sequencing subsystem is configured to:

drive the sequencing nodes in the controller to sequence the messages according to administrator tokens, and sequence the messages in batches in a distributed sequencing mode when the sequencing nodes are multi-sequencing nodes; and the sequencing nodes issue the serial numbers in a secondary broadcast mode.

3. The system according to claim 2, wherein the sequencing subsystem specifically comprises:

a sequencing node selection module configured to realize a selection of the sequencing nodes through the administrator controller;

a sequencing node crash management module configured to realize a crash management of the sequencing nodes through the administrator controller;

an administrator controller crash management module configured to realize a crash management of the administrator controller through the sequencing nodes; and an administrator controller reselection module configured to realize a reselection of the administrator controller through the sequencing nodes.

4. The system according to claim 3, wherein the sequencing node selection module is configured to:

define one sequencing node for each subject tree by taking the subject tree as a unit;

monitor the messages according to the sequencing nodes when the publishing nodes publish the messages;

the sequencing node crash management module is further configured to: select the sequencing nodes through a sequencing node selection algorithm according to a topology situation of each cluster in a network and a publishing situation of each cluster node, and send the selected sequencing nodes to the administrator controller through broadcasting;

wherein the administrator controller determines whether the sequencing nodes crash or not according to replies received from the sequencing nodes.

5. The system according to claim 3, wherein the administrator controller crash management module is further configured to:

start a sequencing thread, and send a successful starting message to the administrator controller, and determine whether the administrator controller crashes or not according to replies received from the administrator controller;

the administrator controller reselection module is further configured to:

send a voting application to other sequencing nodes except a present sequencing node, and vote for the present sequencing node; and select a new administrator controller according to received messages sent by other sequencing nodes.

6. A software defined network publish-subscribe method, comprising the following steps:

sending administrator tokens to sequencing nodes;

sequencing messages by the sequencing nodes, wherein the messages are sequenced in batches in a distributed sequencing mode when the sequencing nodes are multi-sequencing nodes;

selecting the sequencing nodes according to a topology situation of each cluster in a network and a publishing situation of each cluster node, and sending the selected sequencing nodes identifiers through broadcasting;

determining whether the sequencing nodes have crashed or not according to replies received from the sequencing nodes;

sending a message of success in starting a thread, and determining whether an administrator controller crashes or not according to received feedback information;

defining publishing nodes of the messages as temporary cache nodes, selecting central publishing clusters as network edge cache nodes from publishing groups, and selecting cluster nodes on message forwarding paths of the publishing groups as backup cache nodes of the network edge cache nodes;

persistently storing the messages through the network edge cache nodes;

sending the messages in batches to the network edge cache nodes through the temporary cache nodes;

matching ID numbers of the messages with serial numbers through the network edge cache nodes, and caching the messages in files according to a serial number sequence; and calculating current missing messages through the backup cache nodes, and synchronizing the missing messages of the backup cache nodes to the backup cache nodes through the network edge cache nodes.

* * * * *